United States Patent [19]

Bottema

[11] Patent Number: 5,306,566
[45] Date of Patent: Apr. 26, 1994

[54] METHOD OF INHIBITING THE REDUCTION OF THE BOND STRENGTH BY WATER OF A METAL-THERMOPLASTIC POLYMER METAL SANDWICH

[75] Inventor: Jan Bottema, Santpoort-Zuid, Netherlands

[73] Assignee: Hoogovens Groep B.V., Ca Ijmuiden, Netherlands

[21] Appl. No.: 958,596

[22] Filed: Oct. 8, 1992

Related U.S. Application Data

[62] Division of Ser. No. 759,915, Sep. 13, 1991, abandoned.

[30] Foreign Application Priority Data

Sep. 14, 1990 [NL] Netherlands ......................... 9002022

[51] Int. Cl.$^5$ ...................... B32B 15/08; B32B 27/28; C08K 5/09
[52] U.S. Cl. .................................. 428/461; 428/462; 524/300; 524/322
[58] Field of Search ............... 524/300, 322; 428/461, 428/462

[56] References Cited

U.S. PATENT DOCUMENTS

| | | | |
|---|---|---|---|
| Re. 25,200 | 7/1962 | Robinson et al. | 156/244.27 |
| 2,054,113 | 9/1936 | Abrams et al. | 156/324 |
| 2,054,115 | 9/1936 | Abrams et al. | 156/324 |
| 3,443,277 | 5/1969 | Frielingsdorf | 156/244.27 |
| 3,950,207 | 4/1976 | Amat | 156/324 |
| 4,118,258 | 1/1978 | Groveron et al. | 428/462 |
| 4,161,815 | 7/1979 | Land et al. | 156/324 |
| 4,521,265 | 6/1985 | Kunihiko et al. | 156/244.27 |
| 4,690,856 | 9/1987 | Ito et al. | 428/215 |

FOREIGN PATENT DOCUMENTS

| | | | |
|---|---|---|---|
| 989717 | 5/1976 | Canada | 156/244.23 |
| 2444563 | 7/1980 | France . | |
| WO8901407 | 2/1989 | PCT Int'l Appl. . | |
| 1014154 | 12/1965 | United Kingdom . | |
| 1092715 | 11/1967 | United Kingdom . | |

*Primary Examiner*—Paul R. Michl
*Assistant Examiner*—Peter Szekely
*Attorney, Agent, or Firm*—Stevens, Davis, Miller & Mosher

[57] ABSTRACT

The method of inhibiting the reduction of the bond strength by water of a metal-thermoplastic polymer-metal sandwich, where the thermoplastic core contains carbon to carbon double bonds, by incorporating 0.01 to 1.0% of a fatty acid component which comprises at least one fatty acid as an additive.

6 Claims, 3 Drawing Sheets

METHOD OF INHIBITING THE REDUCTION OF THE BOND STRENGTH BY WATER OF A METAL-THERMOPLASTIC POLYMER METAL SANDWICH

This application is a division of application Ser. No. 07/759,915, filed Sep. 13, 1991, now abandoned.

BACKGROUND OF THE INVENTION

1. Field of the Invention

This invention relates to method and apparatus for the manufacture of a laminate of two metal sheets and a layer of thermoplastics material sandwiched between them and adhering to them, particularly the continuous manufacture of such a laminate in which the two sheets are moved along paths to a convergence region and the thermoplastics material is continuously extruded. In the convergence region, the thermoplastics material is squeezed between the sheets to form the layer of the laminate. The invention also relates to the presence of an additive in such a laminate, which provides increased durability, at least against attack by water.

2. Description of the Prior Art

GB-A-2038239 describes a method of forming a laminate of the type indicated above. The pressing together of the first and second metal layers may be carried out for a period of from a few seconds up to about 30 minutes. The temperature of the laminate during pressing is maintained in the range from 150° C. to 329° C. (Example 19 to 21 and 155 respectively).

There is at present a desire to improve the bonding strength and durability of such a laminate, particularly in order to provide new lightweight sheet materials. A possible use for such a material is as a generally horizontal or generally vertical exterior part of a motor vehicle, for which purpose especially high requirements are placed on the quality of the bond between the thermoplastics material of the laminate an the metal sheets. As well as the quality of the bond, i.e. its strength particularly peel strength, the durability of the bonding is also of concern where there is continual penetration of water and also temperature fluctuations. In addition, such a material must be able to undergo deformation processes, in order to achieve the desired shape, and such deformation processes may be cold or hot. Meanwhile, the laminate must retain its strength and durability.

Furthermore it is desirable that the additional step and expense of providing adhesive layers between the extruded thermoplastic material and the metal sheets is avoided.

EP-A-87546 describes a method in which an extruded polymer band, two adhesive layer sheets and the two metal sheets are brought to a nip between a pair of rollers, and squeezed to effect thickness reduction of the polymer band, prior to cooling of the laminate. The thickness reduction may be in the range of 10 to 90%. GB-A-1277350 also shows thickness reduction of the thermoplastics layer during formation of the laminate. Adhesive layer sheets are again employed.

GB-A-1092715 describes a method of forming or shaping aluminium-clad thermoplastic laminates with the application of heating. Acrylonitrile-butadiene-styrene copolymer (ABS) is mentioned as one possible material GB-A-1014154 describes the formation of such laminates and their cold forming. In an example, hot extruded polyethylene is fed into the nip of cooperating pressure rolls together with aluminium foils and is bonded directly to the aluminium.

SUMMARY OF THE INVENTION

It is an object of the invention to provide metal-thermoplastic-metal laminates of improved strength, bonding strength and durability.

It is a further object of the invention to provide a method of making a metal-thermoplastics-metal laminate which can avoid the use of adhesive layers and provides a laminate of high strength and durability.

In the method of the invention, a body of extruded thermoplastics material in flowable form is provided in the convergence region of the metal sheets. The layer of thermoplastics material of the laminate is continuously drawn from this body of thermoplastics material which thus acts as a reservoir, and the body is replenished from an extrusion nozzle for the thermoplastics material. The body has a greater width in the width direction of the slot of the extrusion nozzle than the slot. Thus the body of flowable thermoplastics material contains divergent flows of the materials which have the effect of bringing material from the interior of the body to the surfaces thereof, i.e. the surfaces which contact the converging metal sheets. It has been found that this process of renewal or refreshment of the surface of the thermoplastic material at the convergence region leads to improved bonding of the thermoplastics directly to the metal sheets. It is supposed that this improved bonding is achieved because the thermoplastics material portions which contact the sheet and adhere to it are subjected to less oxidation between extrusion and the adhesion, and/or because additives which may be present in the thermoplastics, and which may tend to inhibit adhesion and may become concentrated at the surface during extrusion of the thermoplastics material, are more uniformly distributed through the thermoplastics material.

The extrusion nozzle for the thermoplastics material is preferably located so close to the convergence region, e.g. in the convergence region, that the body of flowable thermoplastics material i sustained and replenished by the extrusion of the material from the nozzle, in contrast with prior art cases where an extruded band is fed along a path in the extrusion region. This feature of the invention i particularly advantageous when a horizontal extrusion direction is chosen and in the alternative case where the extrusion is vertically downwardly into th convergence region, the extrusion nozzle may be spaced somewhat further from the convergence region.

It is a feature of the invention that the thermoplastics material is brought directly into contact with the metal sheets and adheres directly to them. Thus adhesive layers or adhesive coatings on the metal sheets are not employed. On the other hand, the sheets preferably undergo conventional surface treatment, particularly the treatment by means of chromium compounds such as a Cr (VI) compound or chromic phosphate as is known for aluminium and steel sheets.

In other aspect, the invention seeks to provide improved durability of a metal-thermoplastics-metal laminate. It has been found that the use of fatty acids in the thermoplastic material inhibits action by water tending to reduce bond strength, in the case where the thermoplastics material contains carbon-carbon double bonds. Typically, carbon-carbon double bonds are obtained in a thermoplastics material by the use of polymerised butadiene monomers. The fatty acid is present in certain preferred amounts. The advantage of improved durability is especially obtained when the metal sheets, e.g. aluminium or steel, have been subjected to treatment by a chromium compound prior to contact with the thermoplastics.

Although it is known to include fatty acids as additives in butadiene-containing polymers such as ABS, the purpose of such additives has been as anti-oxidants and/or lubricants in the extrusion process. It has now been found that such fatty acids provide the additional benefit of inhibiting attack by water which reduces the bond strength between the thermoplastic material and metal, and for this purpose the fatty acid should be present in a preferred amount, of 0.01 to 1 wt % of the thermoplastics material, more preferably 0.05 to 0.5 wt %. Preferred fatty acids have 14 to 18 carbon atoms, and are preferably saturated or mono-unsaturated, for example, stearic, palmitic and oleic, and may be used singly or in mixtures.

The inventors have found that the use of fatty acids with 20 carbon atoms does not achieve the advantages of the present invention. That is fatty acids of 20 carbon atoms do not inhibit the attack by water.

The invention also provides apparatus for carrying out the method described above. In the apparatus, there are provided means for causing convergence of the metal sheets along paths at the convergence zone, and extrusion means for the thermoplastic material including a nozzle having a slot shaped aperture for extrusion of a thermoplastics material directly into the convergence zone. The nozzle is located sufficiently close to the convergence zone that the desired body of thermoplastics material is formed and sustained in the convergence zone.

Preferably the nozzle has an outlet end which tapers as seen in section in the width direction of the slot, which can improve access of the nozzle to the convergence zone and additionally can permit the outlet end of the nozzle to be inserted into the body of thermoplastics material. Particularly this insertion of the outlet nozzle into the body improves the divergent or even rolling flows of the thermoplastics material in the body, leading to replacement or renewal of the surfaces of the body contacting the metal sheets by material from the interior of the body.

Another advantage of the method and apparatus of the invention is that the body of flowable thermoplastics material acting as a reservoir in the convergence zone avoids any danger of starvation of the convergence region which might lead to inferior laminate formation.

As already mentioned, oxidation of the thermoplastics material is minimized because contact with air is reduced by the close proximity of the nozzle to the laminate formation region. To reduce risk of oxidation further, an inert gas, particularly nitrogen may be optionally supplied to the convergence zone.

It has also been found that bonding strength can be improved by control of lateral spreading of the thermoplastics material at the convergence zone, i.e. during its squeezing between the metal sheets, for example using side guides.

It is also preferred in the invention that lubricant additives, such as long-tailed amines, are avoided, in the thermoplastics material or that their amount is minimized. Such lubricants tend to reduce the bonding strengths between the thermoplastics and the metal. Furthermore, the fatty acids present should not be present in an excess amount, which may also reduce the bonding strength.

Another advantage of the invention is that the time for which the laminate is maintained under pressure can be very small, because of the rapid bonding of the thermoplastics to the metal sheets achieved by the measures of the invention.

When ABS is used for the thermoplastic material, it has been found that the invention gives good results over the entire feasible operating range at the lamination step of 150° C. to about 330° C., but preferably the temperature is above about 175° C. On the other hand, the temperature should not be so high that excessive oxidation of the thermoplastics is likely. Consequently, the preferred temperature range for the lamination of ABS is 180–200° C.

BRIEF INTRODUCTION OF THE DRAWINGS

Embodiments of the invention will now be described by way of non-limitative example, with reference to the accompanying drawings, in which.

DESCRIPTION OF THE PREFERRED EMBODIMENTS

Examples

Figure 3:
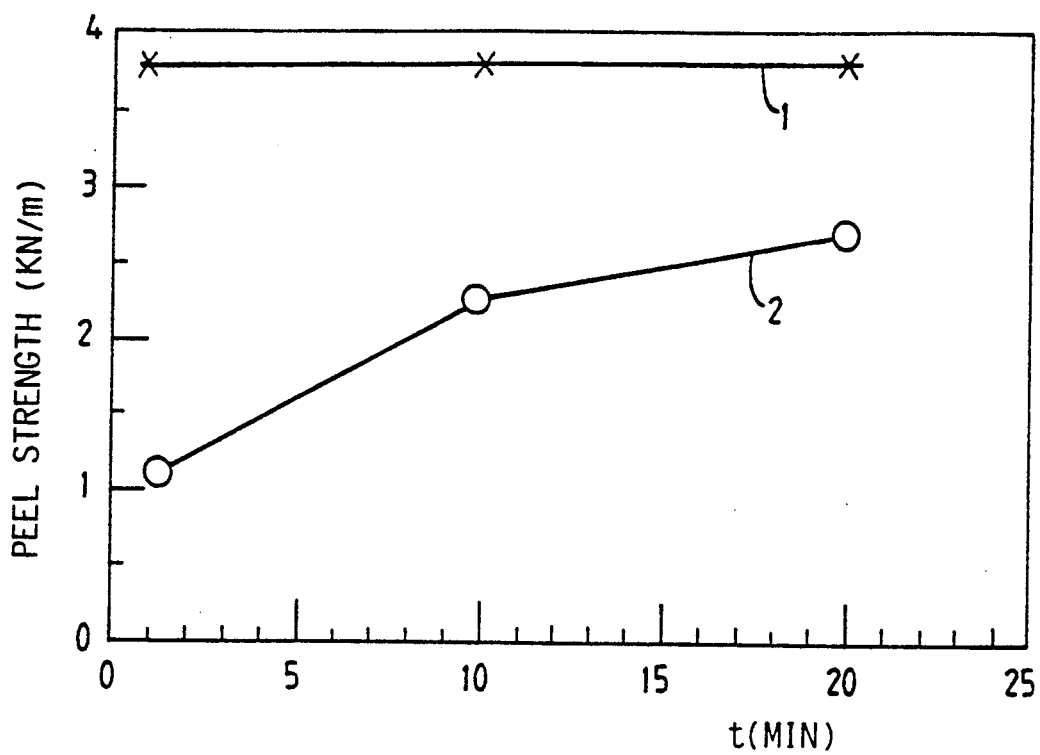
FIGS. 3 and 4 are graphs showing peel strengths of products made in accordance with the invention and comparative products.
Figure 4:
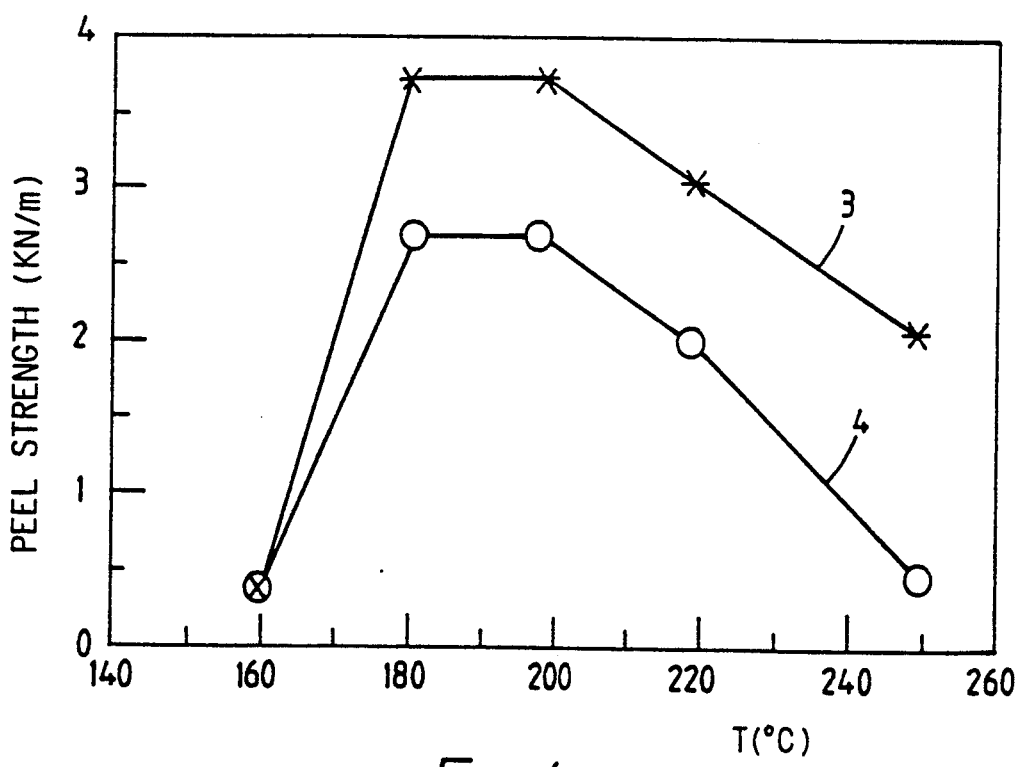
Figure 5:
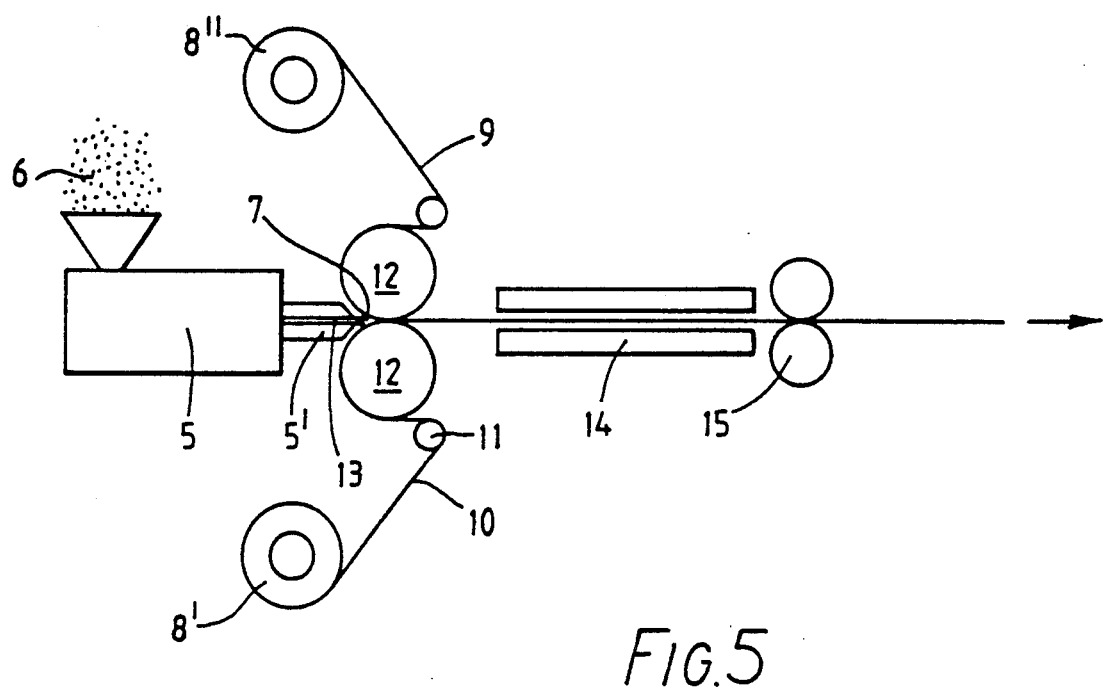
FIG. 5 is a diagrammatic side view of an apparatus in accordance with the invention.
Figure 6:
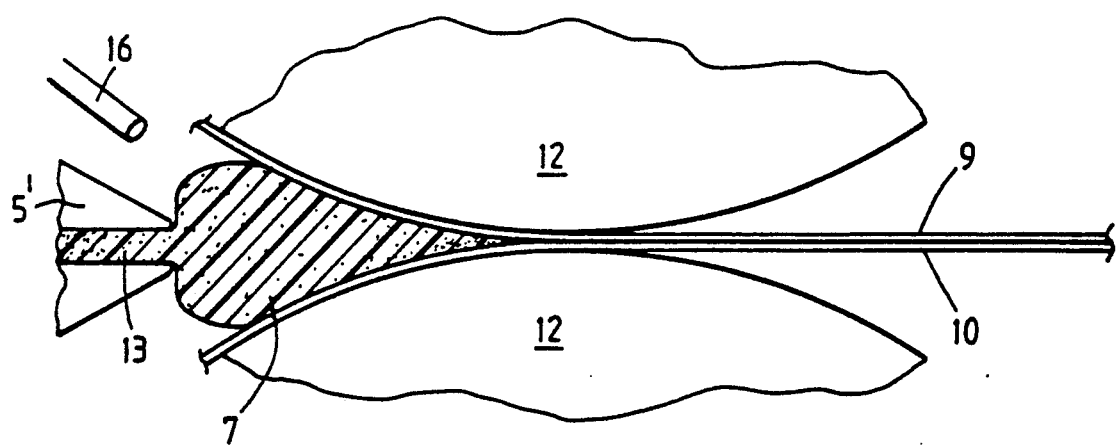
FIG. 6 shows part of the apparatus of FIG. 5.

The Examples of the invention whose test results are given in FIGS. 1 to 4 illustrate the benefit of the use of fatty acids (indicated by % anti-oxidant on the bar charts) in appropriate amounts in accordance with one aspect of the invention, and furthermore demonstrate the benefits obtainable in the method and apparatus of the invention illustrated in FIGS. 5 and 6. The Examples were not performed in the apparatus of FIGS. 5 and 6, since they were done for test purposes, but comparable results are obtained using the apparatus of FIGS. 5 and 6.

In the Examples whose test results are shown in FIGS. 1 to 4, the laminate was produced by placing a heap of granular polymeric material between two aluminium sheets, applying heat to raise the temperature to the desired level and pressing the sheets together. The granular material was heaped in the middle of the plates, so that upon pressing together of the sheets, the thermoplastic material is squeezed laterally between the plates which has the effect of causing exposure of fresh material at the surface of the material, i.e. at the surfaces of the plates. The polymeric material used was acrylonitrile-butadiene-styrene (ABS) of the type sold by Borg-Warner Chemicals under the trade names CYCOLAC L.S. and CYCOLAC G.S.E., containing varying amounts of fatty acids as anti-oxidants, these fatty acids being selected from stearic, palmitic and oleic acids. The materials did not contain long-tailed amines or other lubricants in significant quantities. The aluminium plates were chromium-treated by forming chromium (III) phosphate on the surfaces which contact the thermoplastic material. Thereafter the aluminium plates were degreased and dried. The ABS material was also dried by keeping it at approximately 80° C. for 2 hours, and was then degreased. The thickness of the aluminium plates was 0.2 mm each and the final thickness of the thermoplastic was 0.8 mm, giving a total thickness of the product of 1.2 mm.

The process was performed with four different contents of anti-oxidant, i.e. 0.05 wt %, 0.1 wt %, 0.2 wt % and 0.4 wt % and also on similar ABS material not containing any antioxidant in the form of fatty acid.

The bonding strength of the laminates produced was then measured by a peel test. The test used was the standard 180° peel test in which the laminate is clamped, and one aluminium sheet is pulled off at an angle of 180°, i.e. is peeled off by pulling it back parallel to the surface. The peel force recorded is a measure of the strength of bond. In order to test the effect of water on the bond, the peel test was carried out both without water being present and with water present. The water is applied to the interface between the aluminium sheet and the thermoplastic material during the peeling. The results of the peel test without water are shown by the unhatched bars in Figs. 1 and 2 and the results when water is present are indicated by the hatched bars.

Figure 1:
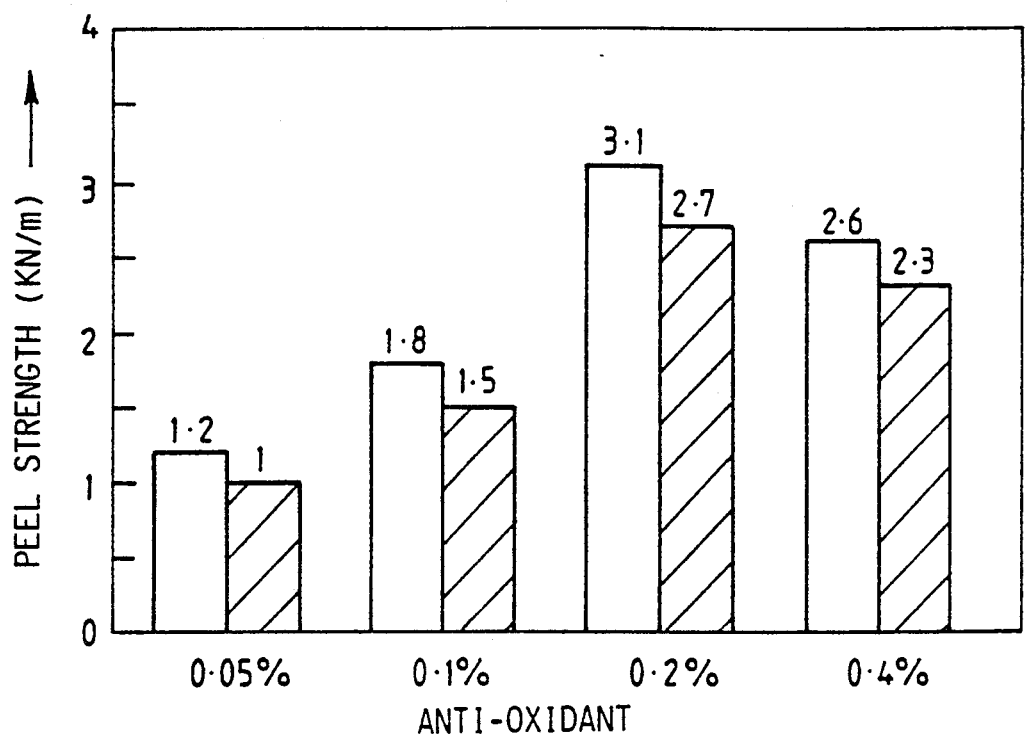
FIGS. 1 and 2 are bar charts showing results of tests on products made in accordance with the invention.

FIG. 1 shows that the peel strength is not greatly affected by the presence of water. This indicates that the durability of the laminate to water presence is high. FIG. 1 also shows that the best result (highest peel strength) was obtained with an anti-oxidant content of 0.2%. With higher fatty acid content, the peel strength declines and other tests have shown that at much higher fatty acid content (over 1%) the peel strength is very low i.e. the lamination is poor.

Figure 2:
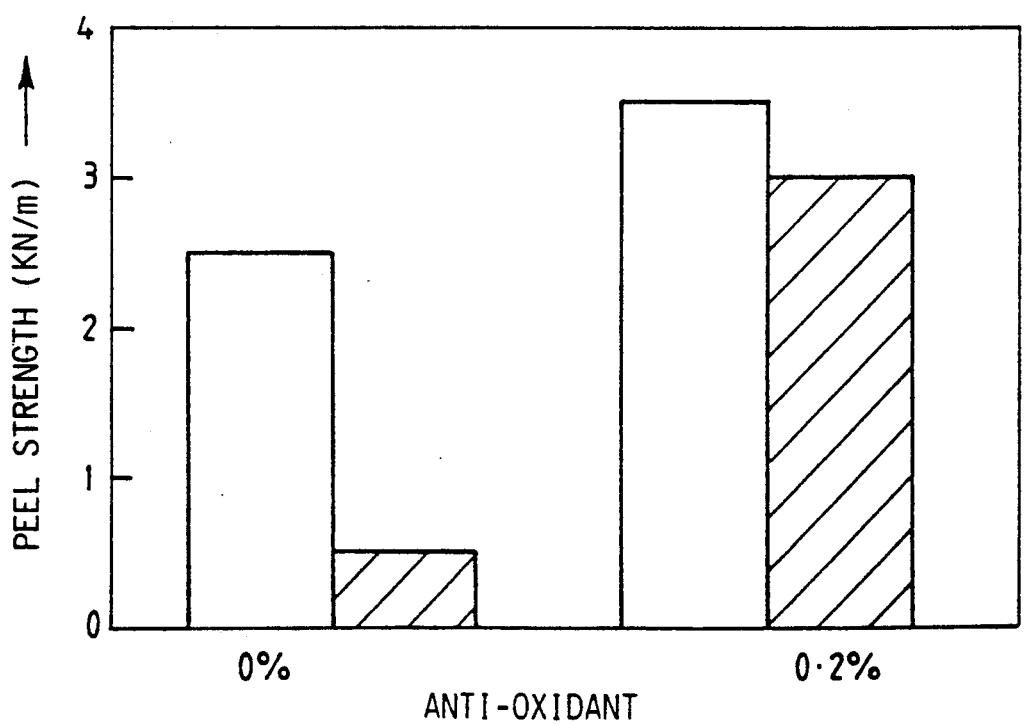

FIG. 2 shows at the left hand side the results obtained with 0% anti-oxidant (fatty acid) and 0.2% anti-oxidant (fatty acid). It can be seen that although the peel strength with 0% anti-oxidant is actually higher than at 0.05% and 0.1% anti-oxidant (see FIG. 1) when water is not present, the peel strength is greatly reduced by the application of water when there is no anti-oxidant. This contrasts with the case at 0.2% anti-oxidant and indeed at other amounts of anti-oxidant.

FIG. 3 shows the peel strength plotted against the time for which laminating pressure was maintained at the operational temperature of 200° C. For the case, line 1, in which the thermoplastic material is caused to flow outwardly to expose new surfaces to the metal sheets, there is no dependency of peel strength upon time of pressure application and very short times can be used. Line 2 in FIG. 3 gives the equivalent results for the case where there is no outward flow during pressing, i.e. a thin extruded sheet of the thermoplastic material is placed between the metal sheets, heated and the sheets are then pressed on to it to form the laminate. In this case the time of pressing has an effect on the peel strength, but in all cases the peel strength is lower than in the case of line 1.

FIG. 4 shows the peel strength of the laminate plotted against the temperature of the materials during the pressing operation. Again the comparison is made between the results of line 3, in which the thermoplastic material is caused to flow outwardly as discussed above during pressing and the results of line 4 for the case where there is no outward flow, i.e. an extruded sheet is placed between the metal sheets a described above. In the case of line 4, the pressing time was 20 minutes. The pressing time for the laminates of line 3 was less, but as FIG. 3 indicates the peel strength is independent of pressing time. The results of FIG. 4 show that the preferred range for the temperature is 175° C. to 200° C.

FIGS. 5 and 6 illustrate the apparatus and method of the invention, in which a body or reservoir of material is formed in the convergence region of the sheets, during a continuous extrusion and lamination process. Referring to FIG. 5, a conventional extrusion machine 5 is shown being fed with thermoplastic granulate 6. The extruding die or nozzle 5' projects from the extruding machine to its outlet end which is located in the convergence zone of the metal sheets 9,10 to be described below. The extrusion aperture of the nozzle 5' has an elongate slot shape, with the direction of elongation perpendicular to the plane of the paper of FIGS. 5 and 6, so that it extrudes a flat band of the thermoplastics material. As FIG. 6 particularly indicates, the outlet end of the nozzle 5' has angled top and bottom surfaces so that the nozzle tapers towards the outlet of the slot 13.

The aluminium sheets 9,10 are of strip form and are stored on coil holders 8' and 8" and pass over guides 11 onto the surfaces of the milling rolls 12. The sheets 9,10 are held against the surface of the roller 12 over about 180°, round to a nip region at which the sheets converge together, and are taken off parallel to each other to a cooler 14 and a pair of traction rolls 15 which pull the sheets continuously from the coils 8' and 8". The rolls 12 are heated, to bring the sheets 9,10 to the desired temperature for lamination.

As FIG. 6 shows, in the convergence region of the sheets 9,10 just upstream of the nip (point of closest approach) of the two rolls 12, the sheets 9,10 come into contact with a body 7 of the extruded thermoplastics material, which is piled up in front of the nip. This body 7 i continuously drawn off by the moving sheets 9,10 to form the thin laminated layer of thermoplastics material between the sheets 9,10 and is replenished, preferably continuously, from the extrusion nozzle 5'. As illustrated the body 7 extends to the mouth of the nozzle 5', and it is even preferred that the tip of the nozzle 5' is immersed in the body 7. The thermoplastic material of the body 7 is in flowable state, and because the body 7 is wider than the width of the slot 13, in the width direction of the slot 13 (i.e. the up and down direction of FIG. 6), there occur diverging and rolling flows of the thermoplastic material in the body 7, with the result that the portions of the thermoplastic materials which reach the surfaces of the sheets 9,10 are fresh portions from the interior of the extruded material. That is to say the surface of the material immediately at outlet from the nozzle 5' becomes immersed in body 7 and fresh material emerges at the surface to contact the sheets 9,10. This causes a redistribution of additives in the thermoplastics material, which additives may tend to accumulate at the surface during the extrusion process. They become more uniformly distributed through the body 7. As a result, a very strong bond is obtained between the thermoplastics material and the metal surfaces (which have been chromium-treated as discussed above) even with a short time of compression in the pinch region of the rolls 12, this time amounting to a few seconds only. The peel strengths obtained by this method are very similar to those shown in FIGS. 1 to 4. The thickness of the metal sheets and the laminate are the same as in the Examples.

Because only a small surface area of the thermoplastic material is exposed to the atmosphere on emergence from the nozzle 5', the amount of oxidation is small. It can be reduced further by directing inert nitrogen gas from one or more nozzles 16 at the convergence region.

The tapering shape of the end of the nozzle 5' allows its easy insertion to the convergence zone of the sheets 9,10 and also permits the nozzle 5' to become embedded in the body 7 as mentioned above.

Provided that the time of pressing of the laminate is sufficient to achieve full bonding, it was found that the bond strength was increased by increase of speed of the sheets; this is perhaps due to increased movement and mixing in the body 7 of thermoplastic material.

With a diameter of the rolls 12 of 15 cm, the distance between the end of the nozzle 5' and the nip of the rolls 12 (common axial plane) was varied from 10 cm to 2 cm. The smaller this distance, the higher the bonding strength. The width of the extrusion slot was 3 mm and its length was 15 cm. The optimum maximum width of the body 7 was found to be 1.5 cm.

What is claimed is:

1. The method of inhibiting the reduction of the bond strength by water of a metal-thermoplastic polymer-metal sandwich, where the thermoplastic core contains carbon to carbon double bonds, by incorporating 0.01 to 1.0% of a fatty acid component which comprises at least one fatty acid as an additive.

2. The method according to claim 1 wherein the total amount of said fatty acid component is in the range of from 0.05 to 0.5% by weight of the thermoplastic material.

3. The method according to claim 1 wherein said thermoplastic material contains polymerized butadiene monomers.

4. The method according to claim 1 wherein the fatty acids of the fatty acid component have 14 to 18 carbon atoms.

5. The method according to claim 1 wherein the fatty acids of the fatty acid component are saturated or mono-unsaturated.

6. The method according to claim 1 wherein the fatty acid component is selected from the group consisting of stearic, palmitic and oleic acids.

* * * * *